May 6, 1952 — H. T. LAMBERT ET AL — 2,595,860
DISK BRAKE CONSTRUCTION
Filed July 24, 1951 — 4 Sheets-Sheet 2
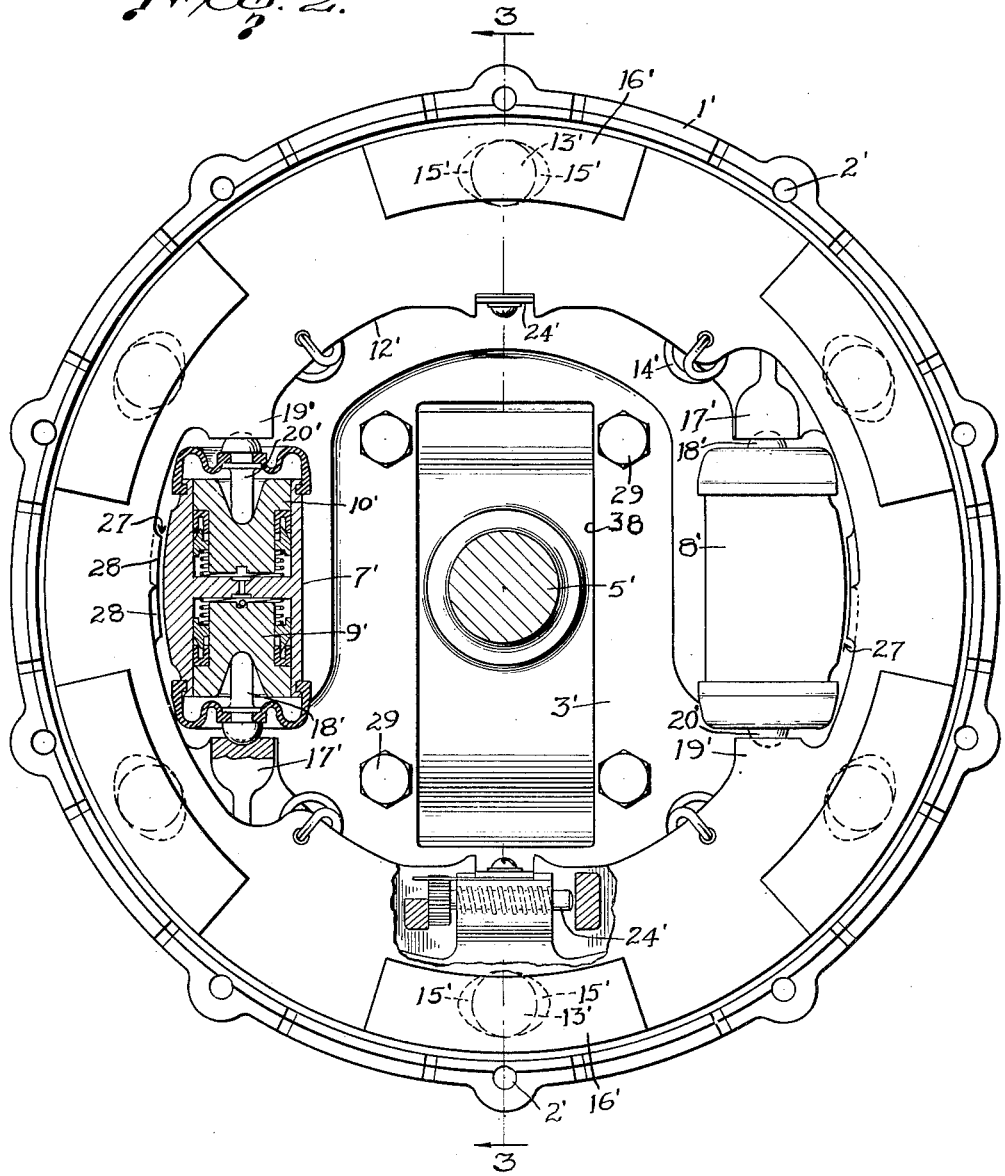
INVENTORS.
H. T. Lambert
BY C. R. Myers
Robert Cobb
Attorneys.

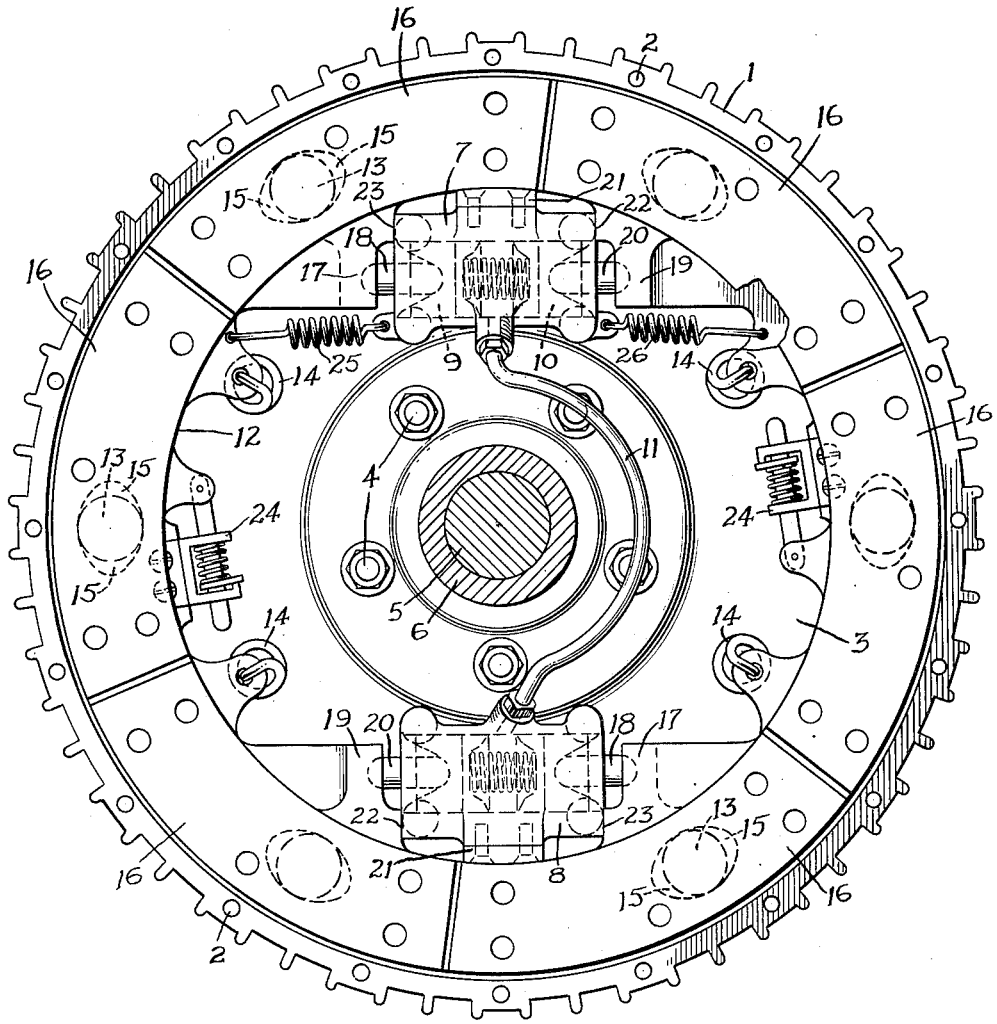

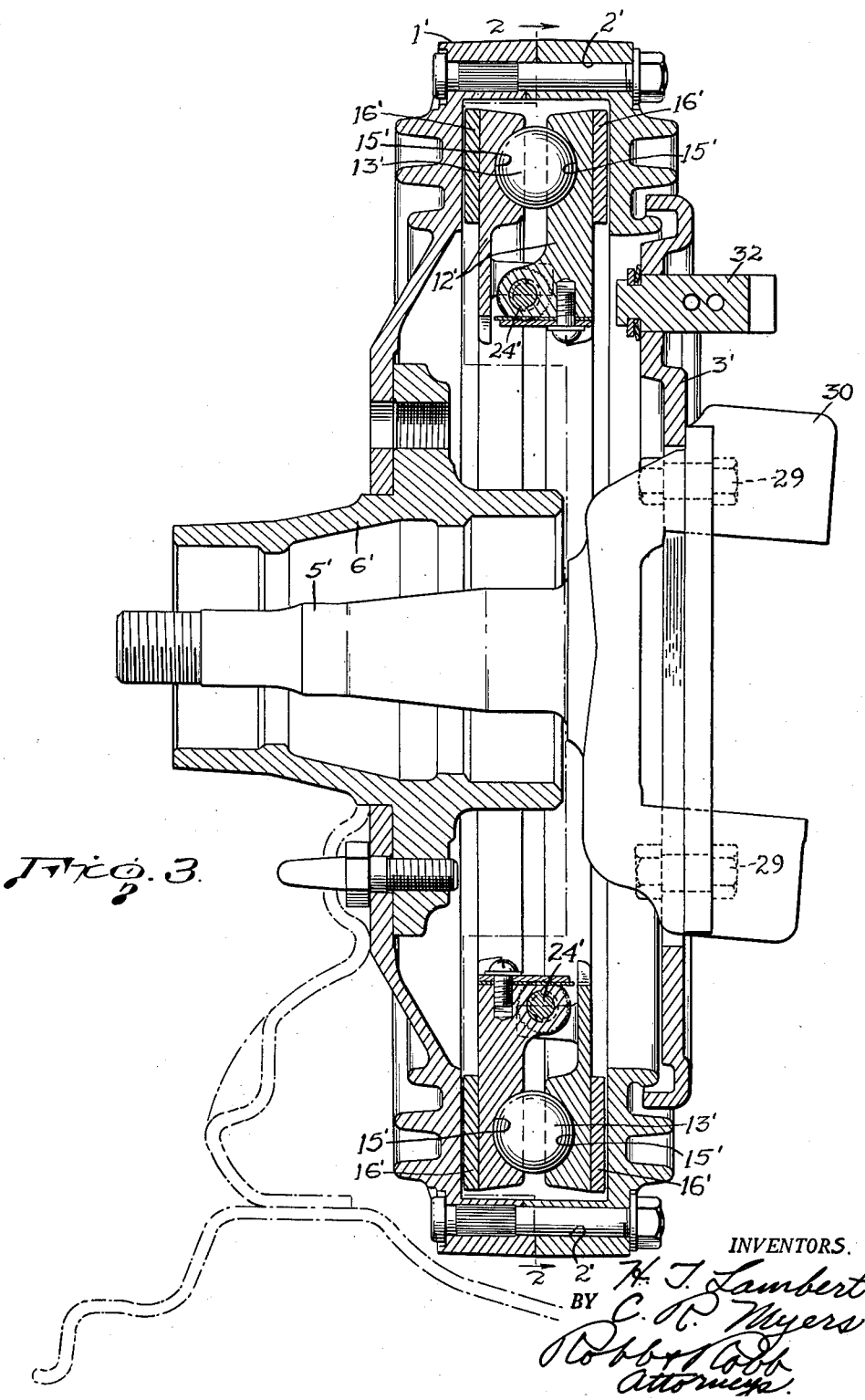

May 6, 1952 H. T. LAMBERT ET AL 2,595,860
DISK BRAKE CONSTRUCTION
Filed July 24, 1951 4 Sheets-Sheet 4
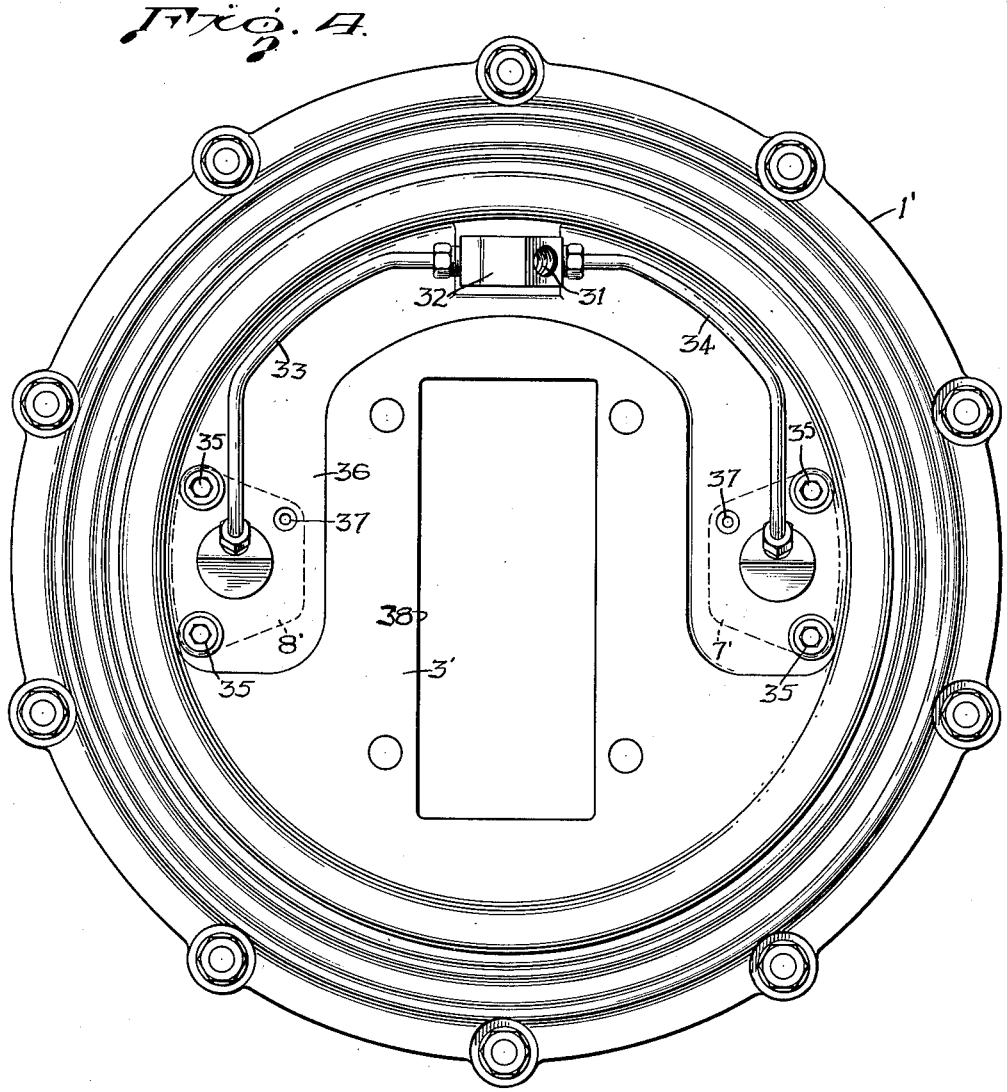
INVENTORS.
H. T. Lambert
BY C. R. Myers
Cobb & Cobb
Attorneys.

Patented May 6, 1952

2,595,860

UNITED STATES PATENT OFFICE 2,595,860

DISK BRAKE CONSTRUCTION

Homer T. Lambert, St. Joseph, and Claude R. Myers, Galien, Mich., assignors, by direct and mesne assignments, to Lambert Brake Corporation, St. Joseph, Mich., a corporation of Michigan Application July 24, 1951, Serial No. 238,283

15 Claims. (Cl. 188—72)

The present application is a continuation-in-part of our prior application Serial No. 66,404, filed December 21, 1948, and relates to disc-brake constructions of the so-called double-disc type wherein the braking action is produced by combined relatively axial and relatively rotative movements between a pair of relatively stationary disc members against a rotary housing or casing which is adapted to be operatively connected to a rotary part to be braked for rotation therewith.

The general construction and advantages of these double-disc brakes will become more fully apparent from reference to Patent No. 2,526,149, issued October 17, 1950, and Patent No. 2,555,651, issued June 5, 1951, among others, which constructions are now well-known and are in commercial use.

As compared with conventional brakes of the drum-and-shoe type, these disc brakes represent a major and revolutionary improvement in the art, which has been fully demonstrated and established, particularly with respect to improved distribution and dissipation of the great heat which is quickly generated incident to the braking of automobiles, buses, trucks, trailers, semi-trailer tractors, airplanes and other vehicles, especially when operated at high speed and/or under heavy loads, or when descending long grades such as are encountered in hilly or mountainous areas.

While these double-disc brakes have solved many of the more serious and important brake problems such as the elimination of the disintegration of the brake lining, loss of pedal due to drum expansion, failure of braking action due to vaporization of brake fluid in the usual hydraulic actuators and/or hydraulic lines, warpage of brake drums, poor or low rate of deceleration, and others which have caused many fatal accidents, the manner of effectively applying the braking forces with smoothness, yet with quick response, and with a minimum of physical effort so as to attain what is commonly known as "soft pedal," and which remains so throughout the life of the brake, has presented additional problems of great difficulty. However, after considerable and painstaking research and development work, we have achieved a practical and efficient solution of these problems by means of the present invention.

One of the primary objects of this invention is to provide a disc brake of the double-disc type which will produce more braking power with about half or less pedal pressure than is required for drum-and-shoe brakes, thereby lessening the dangerous "driver fatigue" on long drivers which has caused many accidents.

Another principal object of the present invention, which is of great importance even in respect to disc brakes of the type disclosed in the aforementioned patents, is to provide a more effective and rigid mounting for the hydraulic actuators or wheel cylinders which previously have been carried by the "floating" double-disc assembly unit, thereby enabling these cylinders to be disposed more nearly coplanar with the braking discs of said assembly so that their forces are transmitted directly in the planes of rotation of the discs, and still further enabling the use of smaller cylinders without materially lessening the effective braking forces.

Another principal objective of the present invention is to provide a disc brake of the double-disc type wherein the double-disc assembly unit is coaxially arranged and disposed about fixed, rigidly mounted hydraulic actuator or power cylinders. According to one form of the invention, the double-disc assembly is concentrically located by and piloted on two diametrically opposed cylinders of the double-acting type, while the cylinders form anchoring abutments for the respective discs, one at a time, according to the direction of rotation, either forwardly or rearwardly, of the rotary part to be braked, whereby to hold one disc against rotation while permitting the other disc to have a limited rotary movement relative to the relatively stationary disc for the purpose of producing axial separation or relative spreading apart of the discs responsive to the camming action of the usual camming balls that are disposed between the discs and are seated in opposed ramped ball seats formed in the opposed faces of the respective discs. The mounting of the double-disc assembly unit in this form of the invention is characterized as a "semi-floating" mounting by reason of the fact that there is at least some slight frictional resistance to axial separation or spreading of the discs during the braking action, owing to the frictional contact between the relatively stationary disc and the cylinders having abutting anchoring engagement therewith.

However, in the preferred embodiment of the invention, the arrangement of the double-disc assembly unit and the cylinders is generally similar to that described in the foregoing, but is characterized by a completely free and "full-floating" mounting of the double-disc unit about the cylinders throughout the braking action. According to this preferred embodiment, the double-disc unit is only generally located or centralized about the cylinders without any direct frictional contact therewith, by reason of the provision of a suitable clearance therebetween, while the discs are supported upon universally movable rocker pins or plungers which in turn are rockably seated on the pistons in the cylinders. Alternate anchoring of the respective discs according to the direction of rotation of the rotary part to be braked is accomplished by alternate abutment of the pistons against the cylinders as the pistons reach the limit of their inward movement in the cylinders, while leaving both discs completely free to move axially relative to each other without any frictional resistance or drag whatsoever tending to lessen the effective braking action.

Other and further objects and advantages of the invention will be hereinafter described and the novel features thereof defined in the appended claims.

In the drawings:

Fig. 1 is a view in elevation of one form of disc brake constructed according to this invention, as applied to an automobile wheel, with the outboard half of the brake casing or housing removed, and with the brake mounting hub and axle shown in section, this form corresponding to one of the forms disclosed in our prior application of which this application is a continuation-in-part;

Fig. 2 is a view in elevation of a modified brake construction constituting the preferred embodiment of the present invention, one of the actuator cylinders being shown in vertical section, and a part of one of the discs being broken away to more fully expose one of the automatic adjusters, this view corresponding to a sectional view as taken on the line 2—2 of Fig. 3;

Fig. 3 is a vertical sectional view as taken on the line 3—3 of Fig. 2; and

Fig. 4 is a view in elevation as seen from the inboard side of the brake assembly of Figs. 2 and 3.

Like reference characters designate corresponding parts in the several figures of the drawings.

Referring first to Fig. 1 of the drawings forming part of the present application, this figure corresponds to Fig. 6 of our original application Serial No. 66,404 hereinbefore referred to. As more particularly described in that application, the brake includes a housing generally designated 1, which is preferably made in two parts that are adapted to be bolted or otherwise fastened together by suitable fastenings (not shown) which extend through spaced openings 2 which are provided about the periphery of the housing sections, the outboard section of the housing being omitted in Fig. 1. The outboard section of the housing is adapted to be connected by bolts or other suitable fastening means to the usual radially extended flange of a wheel mounting hub (not shown), in the case of an automobile wheel, so that the entire brake housing or casing 1 will rotate with the wheel or other rotatable part to be braked, in either a forward or rearward direction, according to the direction of movement of the vehicle or other rotary part, as the case may be.

At the inboard side of the brake housing 1, there is provided a relatively fixed or stationary backing or adapter plate generally designated 3, which backing plate forms a closure for the inboard side of the housing. This backing plate 3 is suitably fastened, as by means of bolts 4, to a flange or other part of the usual axle on the vehicle, said axle being designated 5. A portion of the wheel-mounting hub which is rotatable on the axle 5, is shown in section in Fig. 1, and is designated 6.

Rigidly mounted on and fixed to the backing plate 3 is a pair of hydraulic actuators or wheel cylinders generally designated 7 and 8, respectively, these cylinders being located in this form of the invention at the top and bottom, respectively, of the brake assembly in diametrically spaced relation to each other. The cylinders 7, 8 are substantially identical with each other, and are of any suitable type, but preferably are what are known as double-acting cylinders, there being two pistons designated 9 and 10, respectively, in each cylinder, with the pistons disposed in opposed relation to each other so that hydraulic fluid admitted into each cylinder under the control of the usual master cylinder (not shown) of the conventional hydraulic braking system as used upon automobiles, will be directed between the pistons 9, 10, thereby forcing the pistons in opposite directions outwardly relative to each other and to the cylinder housing. The cylinders 7 and 8 are interconnected by a conduit or tube designated 11 so that both actuator cylinders will work simultaneously responsive to the admission of the hydraulic pressure fluid into either cylinder according to which one of the hydraulic system of the vehicle is connected to, such connection being preferably made at the back of one of the cylinders and leading through the wall thereof so as to communicate with the space between the two pistons therein, and through the tubing 11 with the corresponding space in the other cylinder.

Disposed within the rotary brake housing 1 and surrounding the actuator cylinders 7, 8, there is provided a double-disc unit generally designated 12, said unit including two discs of annular form which are arranged back-to-back, with a series of camming balls 13 disposed therebetween, said camming balls being seated in ramped seats formed in the opposing faces of the respective discs, and being normally held in these seats by a plurality of springs 14 interconnecting the two discs together. This arrangement allows the discs to move relative to each other in both a rotative direction and an axial direction. Accordingly, if a limited rotative movement is imparted to one of the discs of the double-disc unit 12, while the other disc of this unit is held relatively stationary, the discs will spread apart in an axial direction, responsive to the camming action of the balls 13 which are free to roll on the ramped seats designated 15. As the result of this spreading of the double-disc unit 12, the discs will frictionally engage the rotary housing 1 which is extended on opposite sides of the inner disc unit 12 so as to provide opposed axially spaced braking surfaces against which the double-disc unit 12 will exert a powerful braking action. Each disc of the double-disc unit 12 is preferably provided with a series of friction lining segments 16 on the housing-engaging faces of the respective discs.

In order to actuate the discs of the double-disc unit 12 to produce the braking action in the manner just described, one of the two discs of the double-disc unit 12 is provided with a pair of diametrically spaced lugs 17, in each of which is rockably seated a rocker pin 18, the opposite end of each rocker pin being in turn universally and rockably seated in the outer end of one of the pistons of the respective cylinders 7, 8. The other disc of the double-disc unit 12 is also provided with a pair of diametrically spaced lugs designated 19, in each of which is rockably seated another rocker pin 20, these pins in turn being universally and rockably seated in the end of the other piston of the corresponding actuator cylinders 7, 8.

A strip of insulation designated 21 is preferably attached to each of the two actuator cylinders 7, 8, so as to lie between the cylinders and the two discs of the double-disc unit 12, these strips of insulation preventing the transfer of heat from the discs to the hydraulic fluid in the cylinders, which otherwise might tend to vaporize the fluid when not so protected, and which would render the brake inoperative, or at least ineffective. Preferably, there is a slight clearance between the insulating strips 21 and the inner peripheries of the discs of the double-disc unit 12 so that the discs will not actually contact the insulation in normal use of the brake, but generally speaking, the double-disc assembly may be said to be concentrically located by and piloted on the two actuator cylinders 7, 8, according to this form of the invention.

In energizing or operating the brake of the construction shown in Fig. 1, the hydraulic fluid is forced into the actuator cylinders 7, 8, between the opposed pistons in each cylinder, thereby forcing the pistons apart, with consequent transmission of a rotative thrust against the two discs of the double-disc unit 12, and tending to rotate the respective discs in opposite directions, which in turn tends to cause the discs to move apart in an axial direction, relative to each other, responsive to the camming action of the balls 13 therebetween. As the double-disc unit engages the rotary housing 1 which is connected to a wheel or other rotary part to be braked, the frictional drag imparted by the rotary housing to the double-disc unit tends to clock the double-disc unit in the direction corresponding to the direction of rotation of the housing 1, thereby forcing one of the pistons of each actuator 7, 8 inwardly of the cylinders until the shoulder 22 on the lugs 19, or shoulder 23 on the other lugs 17, as the case may be, abuts against the corresponding end of the adjacent actuator cylinder, thereby stopping further clocking movement of the double-disc unit, and anchoring one of the discs of said unit against rotation, while leaving the other disc of said double-disc unit free to rotate slightly with relation to the anchored disc in response to continued pressure in the actuator cylinders 7, 8, and the energizing force provided by the camming action of the relatively rotatable disc. Because of the abutting engagement between the shoulders 22 or 23 and the adjacent ends of the respective actuator cylinders 7, 8, as the case may be, some frictional resistance will be set up in opposition to the axial spreading movement of the discs of the double-disc unit 12, according to the construction illustrated in Fig. 1, and therefore, this construction may be characterized as a "semi-floating" mounting of the double-disc unit with respect to the actuator cylinders. This frictional resistance or drag which results from anchoring one of the discs against rotation is not material in certain brake applications, but in other applications, and more especially where high braking torques impose correspondingly high loads on the double-disc unit 12, a completely free and "full-floating" mounting of the double-disc unit as hereinafter more particularly described, and as illustrated in Figures 2 to 4 inclusive, is preferred.

It will be understood from the foregoing that in the case of rotation of the brake housing 1 in an opposite direction, the action will be the same as that hereinbefore described, except that the other disc will be anchored against the actuator cylinders, and the opposite disc will be free to rotate relatively thereto so as to permit axial spreading of the discs in producing the braking action.

There is also incidentally shown in Fig. 1 a pair of automatic adjusters generally designated 24, said adjusters being interconnected with the two discs of the double-disc unit 12 and serving to automatically take up any wear between the friction surfaces of the brake which may occur during prolonged periods of use of the brake. The details of these adjusters 24 are not material to the present invention, and are more fully disclosed and claimed in Patent No. 2,526,149, hereinbefore referred to.

The two springs, respectively designated 25 and 26, aid the springs 14 in restoring or returning the two discs of the double-disc unit 12 to their normal brake-released position, as well as to keep the lugs 17 and 19 on the respective discs in abutting engagement with the rocker pins 18, 20, and thereby minimizing noise in the brake which might otherwise occur as the result of vibration or rattling of the parts of the brake during operation of the vehicle over rough or bumpy roads. As shown in Fig. 1, the spring 25 is connected at one end to one end of the actuator cylinder 7 and is connected at its opposite end to one of the discs of the double-disc unit 12, whereas the spring 26 is connected at one of its ends to the opposite end of the actuator cylinder 7, and is connected at its opposite end to the other disc of the double-disc unit. Suitable lugs are formed on the actuator cylinder 7, and on the respective discs of the double-disc unit to afford convenient connections with the respective springs above referred to.

Coming now to the preferred embodiment of this invention as illustrated in Figs. 2 to 4 inclusive, it will be seen that the general construction of the brake assembly is similar to that hereinbefore described and shown in Fig. 1. The principal differences in this modified form shown in Figs. 2 to 4 reside in the provision of improved actuator cylinders which are respectively designated 7' and 8' in these figures, and the actuator cylinders are displaced 90° from the positions shown in Fig. 1. The purpose of this displacement is to facilitate mounting of the brake on conventional automobiles and similar vehicles so as to avoid interference with other parts of the vehicle and to eliminate the necessity of any material change in the vehicle design. It is to be understood, however, that the position of the actuators may be changed without departing from the invention.

In addition to the change in the position of the actuators 7', 8', the arrangement of the pistons 9' and 10' thereof, together with the hydraulic fluid passages has also been changed and improved. These details form the subject matter of a separate application and are not material to the present invention. However, instead of anchoring the discs of the double-disc assembly by abutting contact of the lugs 17' and 19' directly against the ends of the actuator cylinders 7', 8', the entire double-disc assembly 12' is wholly free to float on the rocker pins 18' and 20', and in addition, the discs of the double-disc assembly 12' are sufficiently spaced from the respective actuator cylinders 7', 8', as indicated at 27, to normally avoid any contact whatsoever with the actuator cylinders throughout the entire braking operation.

Each disc of the double-disc unit 12' is preferably provided at its inner periphery with a relatively short, inwardly extended protuberance designated 28 which assists in initially locating and centralizing the disc unit as it is assembled in the brake assembly, and also to guard against undue eccentric displacement of the double-disc unit 12' should this unit for any reason tend to shift radially in any direction relative to the axis of rotation of the brake housing or casing 1'.

There is also shown in Figs. 2 to 4 inclusive a modified type of automatic adjuster which is generally indicated at 24', and the details of which are also immaterial to the present invention. These details are more particularly disclosed and claimed in still another application, Serial No. 190,684, filed October 18, 1950, now patent number 2,563,759, dated August 7, 1951, to which reference may be had for a more complete disclosure thereof.

The form of the backing plate designated 3' in this modified construction illustrated in Figs. 2 to 4 inclusive, is also a little different than that shown in Fig. 1, as preferred for a somewhat different type of wheel mounting than that of Fig. 1. The mounting shown in Fig. 1 is more particularly suitable for the rear wheels of an automobile or the like, whereas the mounting shown in Figs. 2 to 4 is more particularly suited to front wheel mountings of conventional automobiles. It is to be understood, however, that the brake assembly shown in Figs. 2 to 4 is adaptable to the type of mounting shown in Fig. 1, and vice versa. At any rate, the backing plate 3' is provided with an opening designated 38 to enable the axle or spindle of the wheel mounting to be extended therethrough, and this backing plate is adapted to be suitably bolted by bolts 29 or otherwise rigidly secured to the axle or spindle 30, as more particularly illustrated in Figs. 2 and 3.

In this modified construction, the hydraulic lines leading from the usual master cylinder (not shown) of the hydraulic brake system of the vehicle are connected to the inlet 31 of a fitting designated 32 which is rigidly mounted on the backing plate 3', as more particularly shown in Figs. 3 and 4. Suitable fluid passages in the fitting 32 divide the pressure fluid and direct the same into two branch conduits or tubes respectively designated 33 and 34, these tubes preferably being located on the outside of the break assembly at the inboard side thereof. The tubes 33 and 34 are also respectively connected to the actuator cylinders 7', 8', both of which have a part thereof extended through the backing plate 3' so as to project inwardly beyond the inboard face of this plate, as clearly illustrated in Fig. 4. The actuators 7', 8', are bolted to the backing plate 3', as by means of bolts 35 extending through the backing plate and into the cylinder castings of the actuators. The upper portion of the backing plate 3' is preferably recessed or indented, as indicated at 36, so that the tubes 33 and 34, and their associated parts will not project materially beyond the inboard face of the backing plate, while exposing the tubes 33 and 34 for direct cooling by air which is permitted to pass over the same when the vehicle is in motion. This arrangement minimizes the heating of the hydraulic fluid in the brake lines by the heat which is generated in the brake during braking action.

The backing plate 3' is also provided with apertures 37 for receiving bleeder fittings (not shown) which are connected with the respective actuator cylinders 7', 8', to control the bleeding of air from the hydraulic system.

Except for the foregoing specific differences, the embodiment illustrated in Figs. 2 to 4 inclusive is generally similar to Fig. 1, as hereinbefore mentioned, and accordingly, those parts of the modified brake assembly which are the same have been given the same reference numerals as in Fig. 1, but the reference numerals have been primed in the modified illustrations.

By way of summarization, it will be understood from the foregoing that the mounting of the inner double-disc unit designated 12 in Fig. 1 is essentially characterized as a semi-floating mounting by reason of the fact that some frictional resistance will occur between the discs of the double-disc unit as they are anchored by abutting contact against the alternate ends of the actuator cylinders 7, 8, according to the direction of motion of the vehicle, whereas in the modified arrangement disclosed in Figs. 2 to 4 inclusive, the mounting of the inner double-disc unit designated 12' is a full-floating mounting, and the double-disc unit freely floats on the rocker pins 18', 20' at all times throughout the operation of the brake, this full-floating mounting assuring a continuous soft pedal action of the brake, as well as smoothness and ease of operation during the complete life of the brake.

While the specific details of the invention have been herein shown and described, the invention is not confined thereto as changes and alterations may be made without departing from the spirit thereof as defined by the appended claims.

We claim:

1. In brake mechanism for vehicles or the like, a rotary member to be braked, a braking unit composed of a pair of discs frictionally engageable with and disengageable from the rotary member aforesaid, each disc having a seat projection arranged in spaced relation to the other and being relatively rotatable with respect to each other, an actuator cylinder fixedly mounted between the seat projections aforesaid and having opposed pistons therein operative on the projections for slightly rotating one disc relative to the other, means between the discs for separating the same to frictionally engage the rotary member to be braked, and a stationary support for said actuator cylinder.

2. In brake mechanism for vehicles or the like, a rotary member to be braked, a braking unit composed of a pair of discs frictionally engageable with and disengageable from the rotary member aforesaid, each disc having a seat projection arranged in spaced relation to the other and being relatively rotatable with respect to each other, an actuator cylinder fixedly mounted between the seat projections aforesaid and having opposed pistons therein operative on the projections for slightly rotating one disc relative to the other, means between the discs for separating the same to frictionally engage the rotary member to be braked, a stationary support for said actuator cylinder, and means cooperating with the pistons for normally holding the discs in brake-released position.

3. Brake mechanism as set forth in claim 1, in which the actuator cylinder is provided with an internal spring disposed between the opposed pistons and tending to separate the pistons towards the respective seat projections on the discs.

4. Brake mechanism as set forth in claim 1, wherein the actuator cylinder is disposed substantially coplanar with the discs so as to apply the pressure of the cylinder pistons directly to and in the plane of the respective discs.

5. Brake mechanism as set forth in claim 1, wherein insulating means is disposed between the actuator cylinder and the discs, with the discs piloted on said insulating means, and spring means connecting the discs together to form an operative unit.

6. Brake mechanism as set forth in claim 1, wherein the ends of the actuator cylinder constitute stop means engageable by the seat projections on the discs for limiting the movement of the discs on brake-release.

7. Brake mechanism as set forth in claim 1, wherein the ends of the actuator cylinder constitute stop means engageable by said discs for limiting the movement of the discs on brake-release, and tensioning means for holding the discs against the stop means.

8. Brake mechanism as defined in claim 1, wherein the stationary support for said actuator cylinder has the form of a backing plate having provision for attaching the same to a flanged wheel axle mount.

9. Brake mechanism for vehicles or the like, comprising a rotary casing having spaced internal friction surfaces, a braking unit composed of a pair of discs frictionally engageable with and disengageable from the rotary member aforesaid, each disc having a plunger seat arranged in opposed relation to the other, a hydraulic cylinder between said plunger seats having opposed pistons and plungers seated on said seats, means for admitting pressure fluid into the cylinder between the pistons, yieldable means for holding the discs in brake-released position, means between the discs for separating the same and bringing them into contact with the casing friction surfaces, and a supporting plate on which said cylinder is fixedly mounted.

10. In brake mechanism of the class described, a rotary member to be braked, said rotary member having the form of a casing provided interiorly with opposed, axially spaced annular braking surfaces, a braking unit disposed within said casing and coaxially supported therein, said braking unit including a pair of complementary discs, said discs being axially movable towards and away from each other and also being rotatable slightly relative to each other, energizing means between said discs for effecting separation of the same for braking engagement with the opposed braking surfaces of the casing responsive to relative rotary movement of said discs, diametrically opposed fixed actuator cylinders for effecting relative rotation of said discs, and means located exteriorly of said casing for establishing communication between said actuator cylinders.

11. Brake mechanism as defined in claim 10, wherein the actuator cylinders are each fixed to a backing plate having provision for fixedly attaching the same to a flanged wheel axle mount, and said backing plate is coaxially arranged at one side of the rotatable casing and forms a closure for the latter side of said casing.

12. A disc brake of the class described, comprising a rotary brake housing adapted to be operatively connected to a rotary part to be braked for rotation therewith, said housing being provided interiorly thereof with opposed, axially spaced annular braking surfaces, a relatively fixed support disposed adjacent to said housing, a pair of fluid pressure responsive actuators fixed to said support in positions at diametrically opposite sides of the axis of rotation of said housing, and a double-disc friction unit disposed within said housing in concentric relation thereto and encircling said actuators normally in slightly spaced relation to said actuators, the discs of said friction unit being free for limited rotation relative to each other and also free for axial movement towards and away from each other and consequently into and out of frictional braking engagement with the braking surfaces within said housing, means between said discs for producing said axial movement of the discs responsive to limited rotation of one disc relative to the other, and means on said discs and operatively engageable with said actuators for producing such relative rotative movement of the discs responsive to fluid pressure in said actuators.

13. A disc brake as defined in claim 12, wherein the double-disc friction unit is wholly supported by pistons located within said actuators and fully floats about said actuators throughout the operation of the brake, said friction unit being substantially free of any frictional contact with said actuators.

14. A disc brake as defined in claim 12, wherein the double-disc friction unit is wholly supported by rocker pins interposed between the discs and said actuators and fully floats about said actuators throughout the operation of the brake, said friction unit being substantially free of any frictional contact with said actuators.

15. A disc brake as defined in claim 12, wherein the double-disc friction unit is supported by pistons located within said actuators and floats about said actuators during operation of the brake, the discs of said friction unit having means alternately engageable with said actuators to alternately anchor one of said discs and to hold it relatively stationary, while leaving the other disc free to rotate relative to the anchored disc responsive to the actuators, according to the direction of rotation of the rotary part to be braked.

HOMER T. LAMBERT.
CLAUDE R. MYERS.

REFERENCES CITED

The following references are of record in the file of this patent:

UNITED STATES PATENTS

| Number | Name | Date |
|---|---|---|
| 2,336,350 | Fields et al. | Dec. 7, 1943 |
| 2,526,149 | Myers et al. | Oct. 17, 1950 |